No. 799,248. PATENTED SEPT. 12, 1905.
F. J. A. MABUT.
REBOUNDING WHEEL.
APPLICATION FILED MAR. 16, 1904.
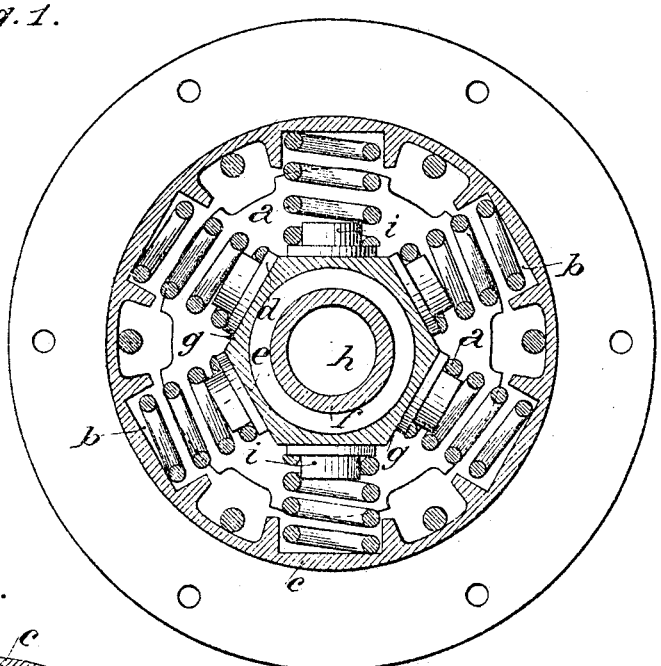
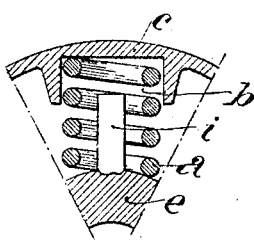
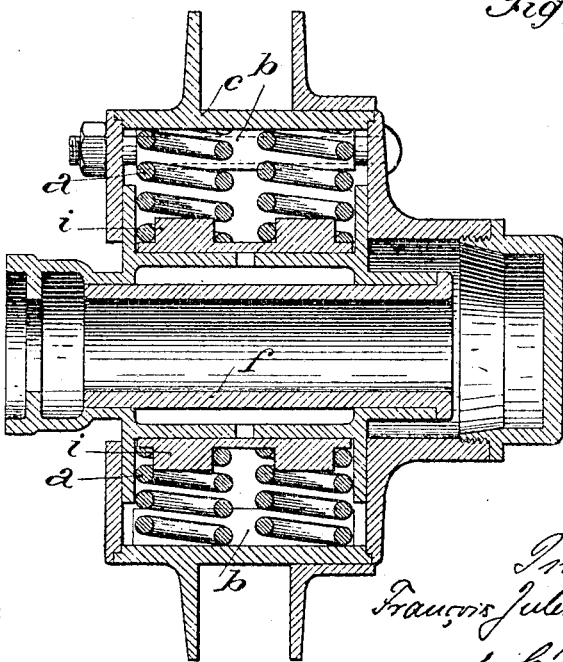

UNITED STATES PATENT OFFICE.

FRANÇOIS JULES ADOLPHE MABUT, OF BRETEUIL, FRANCE.

REBOUNDING WHEEL.

No. 799,248.          Specification of Letters Patent.          Patented Sept. 12, 1905.

Application filed March 16, 1904. Serial No. 198,517.

*To all whom it may concern:*

Be it known that I, FRANÇOIS JULES ADOLPHE MABUT, a citizen of the Republic of France, residing at Breteuil, Department of Oise, France, have invented certain new and useful Improvements in Rebounding Wheels, of which the following is a full, clear, and exact specification.

The present invention has reference to a rebounding wheel the main feature of which resides in a particular interposition of spiral springs (or the like) between the body of the hub and the spindle of the axle, such springs revolving with said hub and the wheel-socket. These springs are preferably so arranged that they not only yield radially, but that they also move freely in the plane of the wheel to avoid any shearing stress arising from the eccentric rotation of the hub with reference to the axis of the axle.

The annexed drawings illustrate, by way of example, various forms of the invention.

Figure 1 is a cross-section showing the hub of a rebounding wheel mounted on a fixed spindle. Fig. 2 is a longitudinal section through the hub. Fig. 3 is a detail view showing a modified form of mounting the springs.

In the construction shown in Figs. 1 and 2 strong helical springs $a$ rest with one end upon the bottom of recesses $b$, formed in the body of the hub $c$ to keep these springs in position, while their other ends bear against plates $d$, which are frictionally applied on the faces of a prismatical sleeve $e$, being fixed on the wheel-socket $f$, which rotates freely with said sleeve, springs, and hub upon the fixed spindle $h$. Projections $i$, formed on the plates $d$, are entering the springs $a$ to secure the connection between the plates $d$ and springs $a$.

It will be understood that the springs $a$ may not only yield in the radial direction, but they may also move bodily in the plane of the wheel without getting out of true during the eccentric rotation of the hub on the axle. They may in this way, without being submitted to a shearing stress, keep their radial direction with reference to the center of the wheel. This translation of the springs is permitted by the plates $d$, capable of sliding freely on the faces of the sleeve $e$, as is clearly shown in Fig. 1. This sliding motion could also be facilitated by the interposition of balls or rolls between the parts $d$ and $e$. The sleeve $e$ might also be mounted on balls on the socket $f$ instead of being secured thereon, as shown.

The plates $d$ may be dispensed with, and when desirable the projections $i$ may be formed integral with or connected to the sleeve $e$, as shown in Fig. 3, and in such case the inner ends of the springs are much wider than the diameter of the projections $i$. In the case of a rotating axle the sleeve $e$ should be rigidly secured upon the end of the axle.

Having thus fully described the nature of my invention, what I claim, and desire to secure by Letters Patent of the United States, is—

A rebounding wheel having an outer hub with sockets for springs and an inner hub in the shape of a prismatical sleeve of polygonal cross-section secured on the axle-box with rectangular outer surfaces, and having helical springs interposed between said hubs, said springs resting with one end in the sockets of the outer hub and with the other end on sliding plates, adapted to slide on said outer surfaces, substantially as described and for the purpose set forth.

In witness whereof I have hereunto set my hand in presence of two witnesses.

FRANÇOIS JULES ADOLPHE MABUT.

Witnesses:
VICTOR PRÉVOST,
HANSON C. COXE.